United States Patent Office 2,860,731
Patented Nov. 18, 1958

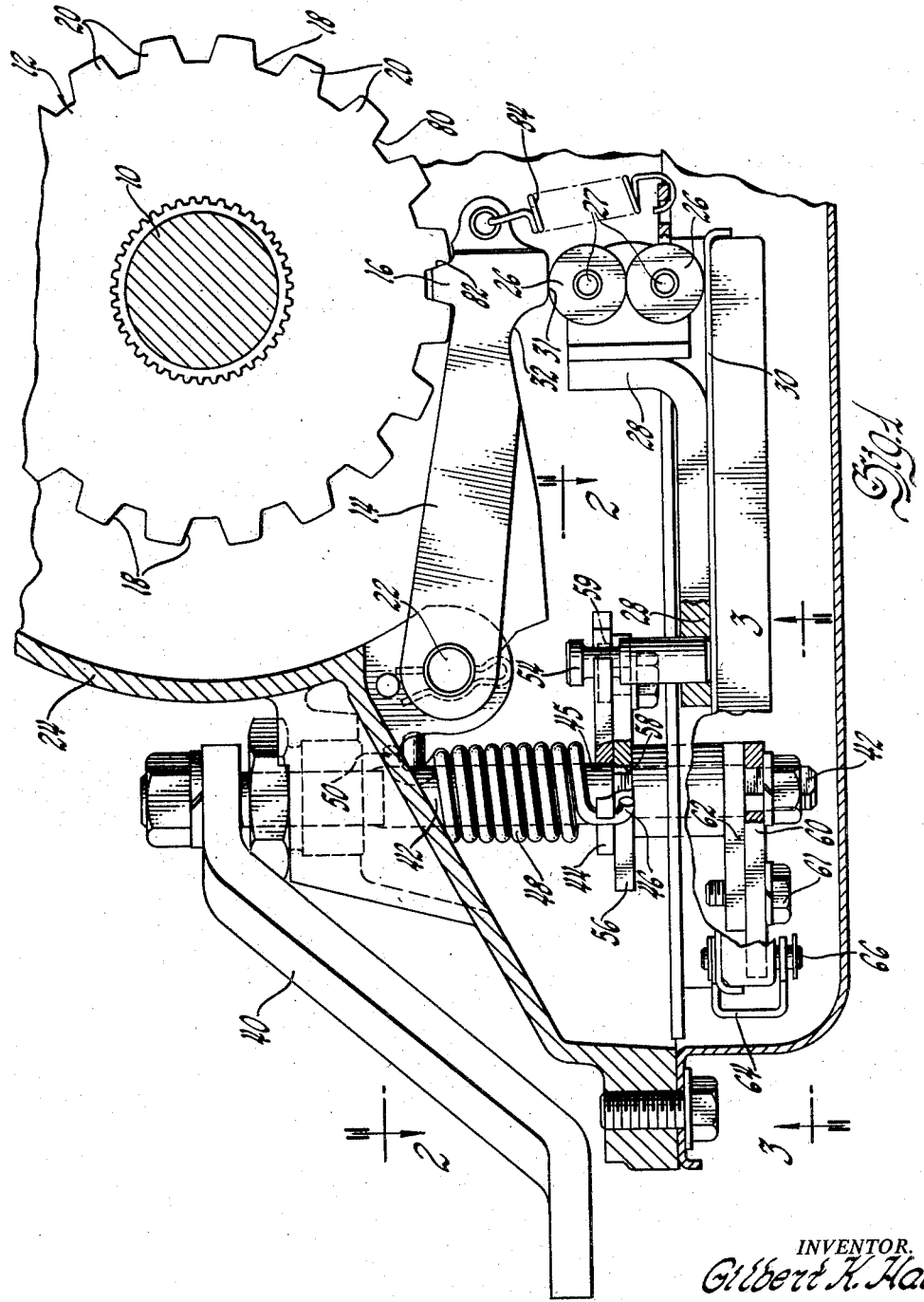

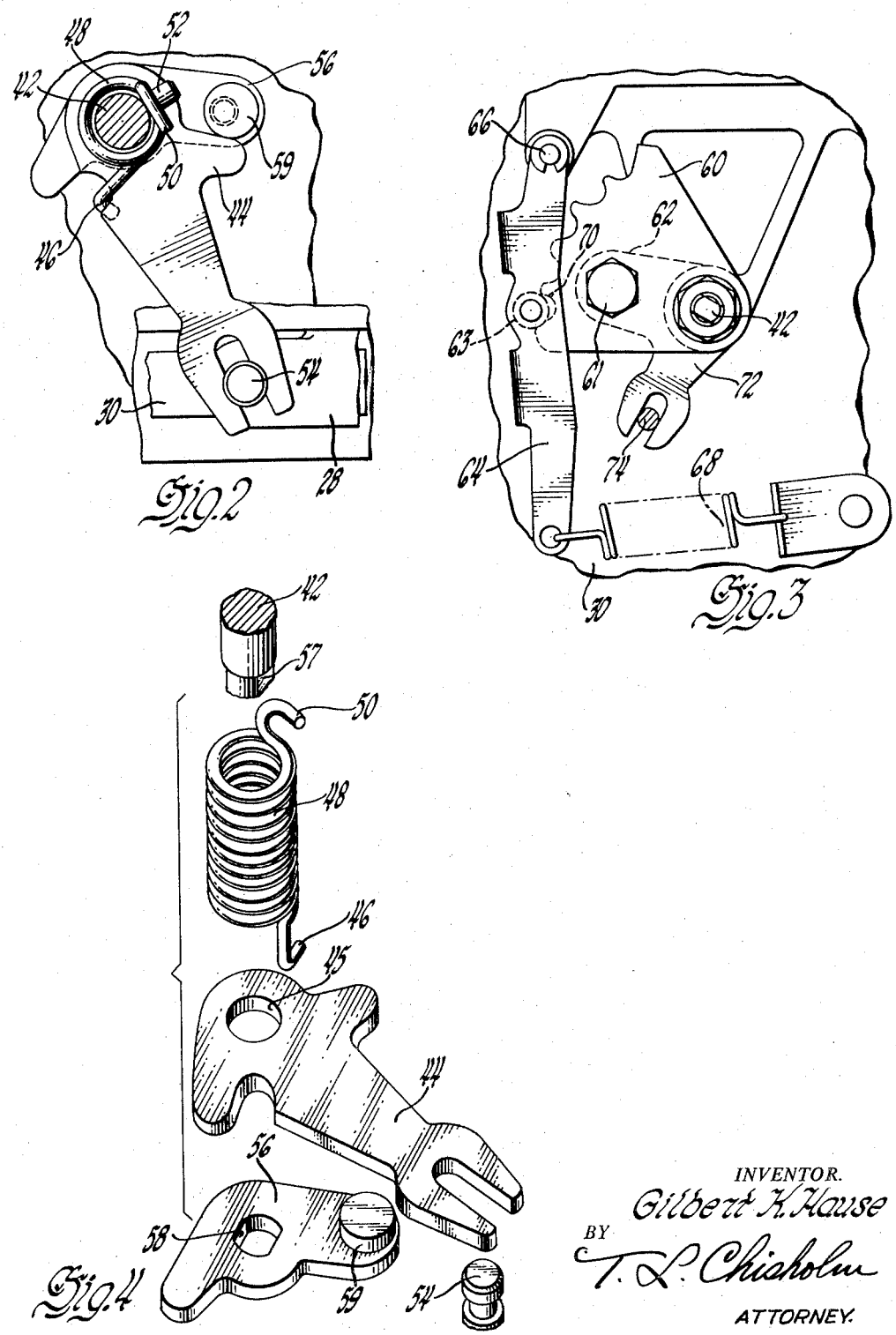

2,860,731
POSITIVE PARKING BRAKE

Gilbert K. Hause, Franklin, Mich., assignor to General Motors Corporation, Detroit, Mich., a corporation of Delaware Application August 2, 1956, Serial No. 601,698

6 Claims. (Cl. 188—69)

This invention relates to parking locks or parking brakes for motor vehicles. It is particularly suited to vehicles having automatic transmissions in which a single control device (which may be operated by a lever on the steering post, for example) both operates a control valve for conditioning the transmission and locks or unlocks a parking lock.

It is usual to provide a parking lock which includes a notched disc or gear keyed to the output shaft of a transmission and a pawl or tooth which may be moved into a notch of the gear for locking the shaft against rotation. This design involves problems of simplicity of control and positive action because it is important that the operator of the vehicle be able to lock the device certainly and securely without much attention and by simple manipulations. It is also a problem to provide ways in which this can be accomplished so that the pawl will be certain to enter a notch because when the pawl is first operated it may strike a tooth between the notches and thus momentarily be prevented from going into locking engagement. When this happens, the driver may leave the vehicle, thinking it is locked. Consequently, means must be provided for insuring that the vehicle will be locked if it subsequently starts to move. It is also necessary to have the pawl effect a positive locking engagement after it has once been placed in a notch in the gear so that the pawl cannot, under any circumstances, be removed without the intention and positive act of the driver. Another problem resides in the arrangement to remove the pawl from the gear to permit the car to be driven. When the car is parked on an incline, the gear can bear with great force against the parking pawl. Consequently, unless special provision is made to prevent it, it is possible to have this force so great that the operator cannot unlock the car. When these devices are used on cars having automatic transmissions, it is customary to have the parking lock operated by the same operating mechanism that actuates the selector valve which conditions the transmission for forward and reverse driving and it is consequently necessary to be able to remove the parking lock before the lever can be moved into any of the drive positions. If the car should be parked on a hill it might be impossible to move the car.

This invention seeks to solve the problems and avoid the disadvantage outlined above by providing an improved gear and pawl locking device in which the pawl can be yieldingly urged into locking position so that if the pawl happens to strike a tooth instead of a notch in the locking gear the actuating mechanism of the pawl nevertheless stays in position and conditions the pawl to be automatically placed in a notch in the gear upon a very slight movement of the car. The device is arranged so that when the tooth enters the notch the pawl is positively held in the notch so that the parking device cannot be unlocked without the intention and positive act of the driver. It is also an object of the invention to provide an actuator for moving the pawl into locking position only, which device can be removed positively from locking position by the driver in moving the control mechanism to a drive position. Thus, after the operating device for the pawl has been removed, whether or not the pawl is removed from the notch or remains in locking position, the control mechanism is free to be moved to a drive position. Thereafter, if power is applied, the torque on the parking gear will force the locking pawl out of the position due to the particular design of the faces of the teeth on the pawl and the gear.

These and other objects and advantages of the invention will be apparent from the following description and in the accompanying drawings in which:

Fig. 1 is a transverse vertical section through a portion of a transmission showing partly in elevation and partly broken away a parking mechanism embodying one form of my invention;

Fig. 2 is a section on the line 2—2 of Fig. 1;

Fig. 3 is a section on the line 3—3 of Fig. 1; and

Fig. 4 is an exploded perspective view of parts constituting a portion of the device for operating the parking lock.

Referring first to Fig. 1, output shaft 10 of any suitable automatic transmission, which is connected to the propeller shaft of the vehicle, is keyed to a notched disc or parking gear 12. The gear may be held against rotation to prevent movement of the car by a pawl 14 having a locking tooth 16 which may be placed in any of the notches 18 between adjacent teeth 20. The pawl is mounted on a pivot 22 in the transmission casing 24 and may be swung about the pivot into locking position by a cam including a pair of rollers 26 mounted on pivots 27 on a traveler 28 in rolling contact with each other. The rollers roll on a supporting abutment 30 and a cam follower surface 32 on the pawl. When the axes of both rollers and the center of the tooth 16 are in alignment, the pawl is positively held in a notch by the abutment 30 and rollers 26. In this position the upper roller 26 bears on a substantially flat surface 31 on the pawl perpendicular to the radial line from shaft 10 through the pivots 27, that is the surface 31 is tangent to a circle about the center of the shaft. In this way there can be no component of force from the pawl tending to move the rollers out of locking position and the pawl is positively held by a solid stack of metal parts without putting any force on the pivots 27 due to clearance between the rollers and their pivots.

The traveler 28 is operated both into and out of locking engagement by the following mechanism. A lever 40 is keyed to a shaft 42 journaled in the casing 24. A fork 44 is journaled loosely on the shaft 42 by the round hole 45 (see Fig. 4) and is engaged by the lower hooked end 46 of a coil spring 48 disposed about the shaft. The upper end 50 of the spring is hooked around a pin 52 in the shaft 42. The fork receives a pin 54 rigidly secured to the traveler 28. Adjacent the fork is an arm 56 keyed to a non-circular portion 57 of the shaft by a non-circular hole 58 and carrying an adjustable stop 59 which lies adjacent and in the plane of the fork 44.

The lever 40 is connected by known linkage (not shown) to an operating member, usually a selector lever, accessible to the driver. When the lever 40 is rotated toward the eye of the observer as Fig. 1 is seen the shaft 42 is rotated counterclockwise as Fig. 2 is seen. This stresses the spring torsionally to urge the fork 44 counterclockwise about the shaft 42 as Fig. 2 is seen, and this urges the carrier 28 to the right as Fig. 1 is seen. If the locking tooth 16 happens to be opposite a notch 18, the cam rollers 26 acting on the cam surface 32 simply rotate the pawl 14 about the pivot 22 and place the parts in the position shown in Fig. 1 in which the parking gear 12 is positively locked. However, if the tooth 16 is opposite a tooth 20, the carrier cannot move any farther to the right and the spring is wound up without moving the fork 44. If the shaft 42 is held in this position, and it can be by apparatus which will be described, then any subsequent slight movement of the car will bring a notch 18 opposite the tooth 16 which is now being urged toward the gear by the torsion in the spring 48. The tooth will therefore move into the notch and become locked as explained above.

In order to hold the shaft 42 in any desired control position, it is provided with a notched detent plate or sector 60 journaled on the end of the shaft 42 and adjustably secured by a bolt 61 to an arm 62 keyed to the shaft 42. The detent plate is engageable by a roller detent 63 carried on an arm 64 pivoted at 66 to the casing and urged toward the detent plate by a spring 68. The edge of the detent sector is provided with various notches for holding the shaft 42 in the various positions in which it is placed by the control arm 40. When the shaft 42 is rotated clockwise as far as it will go as Fig. 3 is seen, it is in the parking position, and the detent roller 63 drops into the notch 70. The parts are so proportioned that the spring 68 and detent 63 hold the shaft 42 in the position of Fig. 3 and keep the coil spring 48 stressed even when the tooth 16 is on the end of a tooth 20. The driver can safely leave the car after placing the shaft 42 in this position, for any subsequent slight movement of the car will lock it.

The other notches illustrated are for positioning the detent plate and shaft in various positions which control the transmission but do not affect the parking lock in any way. When the shaft 42 is in position for the detent 63 to engage any of these other notches the cam rollers 26 are to the left of the position shown in Fig. 1 and do not urge the pawl 14 toward the gear 12.

The arm 62 which has a fork 72 engaging an operator 74 for positioning a selector control valve in any suitable manner as is known.

In order positively to remove the parking pawl from the gear 12 when desired, the carrier 28 is moved to the left, as Fig. 1 is seen, positively by rotation of the control shaft 42 clockwise, as Fig. 2 is seen, in which movement the stop 59 positively rotates the arm 44 with the shaft. Preferably the side faces 80 of the teeth and the side faces 82 of the parking pawl lock 16 are disposed at such an angle that torque in either direction on the parking gear 12 urges the tooth 16 out of the slot 18 in which it is placed. This is done to insure unparking on a hill, but the ejecting force on the pawl might be great enough to hold the carrier in locking position if the carrier were moved to unlocked position by the spring 48. This makes it important to remove the carrier 28 from locking position positively.

If desired, the pawl may be urged out of locking position by a light spring 84 which both assures removal of the parking tooth 16 when the car is parked on perfectly level ground when there is no torque to eject the pawl, and it also prevents accidental contact between the pawl 14 and the gear 12 while driving, which might occur due to the rough roads.

I claim:

1. Means for at times preventing rotation of a rotatable part comprising in combination a peripherally notched member adapted to rotate whenever the part is rotated, non-rotatable means, a pawl pivoted to said means and having a locking tooth adapted to be received in any of the notches of the member to lock the member against rotation, a cam surface on the pawl, an abutment, an actuator for the pawl including a first roller journalled on the actuator and adapted to engage the cam surface and a second roller journalled on the actuator in rolling contact with the first roller and adapted to support the actuator on the abutment and to support the first roller against the pawl, and means for moving the actuator along the abutment to move the pawl toward the member and to permit the pawl to move away from the member.

2. Means for at times preventing rotation of a rotatable part comprising in combination a peripherally notched member adapted to rotate whenever the part is rotated, non-rotatable means, a pawl pivoted to said means and having a locking tooth adapted to be received in any of the notches of the member to lock the member against rotation, a cam surface on the pawl, an abutment, an actuator for the pawl including a first roller journalled on the actuator and adapted to engage the cam surface and a second roller journalled on the actuator and adapted to support the actuator on the abutment, and means for placing the actuator with one roller on the abutment and so that the center of rotation of the member, a notch, the pawl tooth and the centers of both rollers are in a line.

3. Means for at times preventing rotation of a rotatable part comprising in combination a peripherally notched member adapted to rotate whenever the part is rotated, non-rotatable means, a pawl pivoted to said means and having a locking tooth adapted to be received in any of the notches of the member to lock the member against rotation, a cam surface on the pawl, a holding surface on the pawl which when the pawl is in a notch is tangent to a circle whose center is the center of rotation of the member, an abutment, an actuator for the pawl including a first roller journalled on the actuator and adapted to engage the cam surface and a second roller journalled on the actuator and adapted to support the actuator on the abutment, and means for placing the actuator with one roller on the abutment and the other roller tangent to said holding surface.

4. Means for at times preventing rotation of a rotatable part comprising in combination a peripherally notched member adapted to rotate whenever the part is rotated, non-rotatable means, a pawl pivoted to said means and having a locking tooth adapted to be received in any of the notches of the member to lock the member against rotation, a cam surface on the pawl, an abutment, an actuator for the pawl including a first roller journalled on the actuator and adapted to engage the cam surface and a second roller journalled on the actuator and adapted to support the actuator on the abutment, and means for moving the actuator linearly along the abutment to move the pawl toward the member and to permit the pawl to move away from the member, said last-mentioned means including a spring which when stressed urges the actuator in the direction to lock the member, means for stressing the spring, and means for positively moving the actuator in the opposite direction.

5. Means for at times preventing rotation of a rotatable part comprising in combination a peripherally notched member adapted to rotate whenever the part is rotated, non-rotatable means, a pawl pivoted to said means and having a locking tooth adapted to be received in any of the notches of the member to lock the member against rotation, a cam surface on the pawl, an abutment, an actuator for the pawl including a first roller journalled on the actuator and adapted to engage the cam surface and a second roller journalled on the actuator and adapted to support the actuator on the abutment, and means for moving the actuator along the abutment to move the pawl toward the member and to permit the pawl to move away from the member, said last-mentioned means including a shaft, an arm journalled on the shaft and engaging the actuator, a spring surrounding the shaft, the spring being anchored at one end to the shaft and at the other end to the arm, means for rotating the shaft to a position which stresses the spring to urge the arm and the actuator yieldingly in the direction to lock the member, and a second abutment fixed to the shaft for positively moving the arm and the actuator in the opposite direction.

6. Means for at times preventing rotation of a rotatable part comprising in combination a peripherally notched member adapted to rotate whenever the part is rotated, non-rotatable means, a pawl pivoted to said means and having a locking tooth adapted to be received in any of the notches of the member to lock the member against rotation, a cam surface on the pawl, an abutment, an actuator for the pawl including a first roller journalled on the actuator and adapted to engage the cam surface and a second roller journalled on the actuator and adapted to support the actuator on the abutment, and means for moving the actuator along the abutment to move the pawl toward the member and to permit the pawl to move away from the member, said last-mentioned means including a shaft, an arm journalled on the shaft and engaging the actuator, a spring surrounding the shaft, the spring being anchored at one end to the shaft and at the other end to the arm, means for rotating the shaft in both senses of rotation, the shaft being adapted when rotated in one sense to stress the spring to urge the actuator yieldingly in the direction to lock the member, and a stop rigidly secured ot the shaft and adapted to prevent relative rotation between the shaft and the arm when the shaft is rotated in the opposite sense beyond a predetermined position.

References Cited in the file of this patent

UNITED STATES PATENTS

| | | |
|---|---|---|
| 1,852,935 | Morier | Apr. 5, 1932 |
| 1,995,936 | Matson | Mar. 26, 1935 |
| 2,379,829 | Russell | July 3, 1945 |
| 2,387,449 | Kaman | Oct. 23, 1945 |
| 2,653,689 | Hasbany | Sept. 29, 1953 |
| 2,689,029 | McFarland | Sept. 14, 1954 |
| 2,709,504 | Mamo | May 31, 1955 |
| 2,770,326 | Wayman | Nov. 13, 1956 |